United States Patent
Kaminski

(10) Patent No.: US 10,580,286 B1
(45) Date of Patent: Mar. 3, 2020

(54) V2X COMMUNICATION SYSTEM UTILIZING RFID

(71) Applicant: Ford Global Technologies, LLC, Dearborn, MI (US)

(72) Inventor: Michael David Kaminski, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/172,968

(22) Filed: Oct. 29, 2018

(51) Int. Cl.
G08B 25/00 (2006.01)
G01S 19/17 (2010.01)
H04W 4/90 (2018.01)
G08B 25/10 (2006.01)
G08B 21/02 (2006.01)

(52) U.S. Cl.
CPC ............ G08B 25/004 (2013.01); G01S 19/17 (2013.01); G08B 21/02 (2013.01); G08B 25/10 (2013.01); H04W 4/90 (2018.02)

(58) Field of Classification Search
CPC ...... G08B 25/004; G08B 25/10; G08B 21/02; H04W 4/90; G01S 19/17
See application file for complete search history.

(56) References Cited

U.S. PATENT DOCUMENTS

| | | |
|---|---|---|
| 6,958,707 B1 | 10/2005 | Siegel |
| 8,886,158 B2 * | 11/2014 | Matsuo ............... H04L 12/1895 455/404.2 |
| 9,990,518 B2 | 6/2018 | Nikitin et al. |
| 2002/0055861 A1* | 5/2002 | King ....................... G06Q 10/10 705/4 |
| 2010/0117869 A1* | 5/2010 | Rieth ..................... G08G 1/205 340/989 |
| 2010/0130161 A1* | 5/2010 | Stahlin ................. G08B 25/012 455/404.1 |
| 2012/0164968 A1* | 6/2012 | Velusamy .............. G08G 1/205 455/404.2 |
| 2015/0109450 A1* | 4/2015 | Walker ................. G07C 5/0866 348/148 |
| 2015/0342542 A1* | 12/2015 | An ......................... A61B 5/747 455/404.2 |
| 2016/0087655 A1* | 3/2016 | Kim ........................ H04W 4/90 455/404.1 |
| 2016/0272140 A1* | 9/2016 | Kim ....................... H04M 11/04 |
| 2017/0018182 A1* | 1/2017 | Makled ................... G01C 21/36 |
| 2017/0032666 A1 | 2/2017 | Pretorius et al. |
| 2017/0034278 A1* | 2/2017 | Kulnick ................. G08G 1/205 |
| 2017/0046216 A1* | 2/2017 | Stenneth ............. G06F 11/0793 |
| 2017/0135136 A1* | 5/2017 | Lei ....................... H04M 1/7253 |
| 2017/0192421 A1 | 7/2017 | Vega et al. |
| 2018/0204394 A1* | 7/2018 | Dahl ....................... G07C 5/008 |

* cited by examiner

*Primary Examiner* — Mazda Sabouri
(74) *Attorney, Agent, or Firm* — Brooks Kushman PC; Michael Spenner

(57) ABSTRACT

A vehicle includes one or more controllers, programmed to responsive to detecting an accident event and an unavailability of a telematics controller, generate an emergency message to broadcast by a radio-frequency identification (RFID) transceiver, and responsive to detecting a digital entity within a predetermined range from the vehicle, send the emergency message to the digital entity.

11 Claims, 5 Drawing Sheets

V2X COMMUNICATION SYSTEM UTILIZING RFID

TECHNICAL FIELD

The present disclosure is generally related to a vehicle communication system. More specifically, the present disclosure is related to a vehicle-to-everything (V2X) communication system.

BACKGROUND

Current vehicle communication systems heavily rely on a cellular network connection via a telematics control unit (TCU). However, there are situations under which the TCU cannot maintain a cellular connection. For instance, in case of an accident, the TCU may be damaged by the impact of the accident and the vehicle user may be unable to make an emergency phone call via the on-board vehicle communication system.

SUMMARY

In one or more illustrative embodiment of the present disclosure, a vehicle includes one or more controllers, programmed to responsive to detecting an accident event and an unavailability of a telematics controller, generate an emergency message to broadcast by a radio-frequency identification (RFID) transceiver, and responsive to detecting a digital entity within a predetermined range from the vehicle, send the emergency message to the digital entity.

In one or more illustrative embodiment of the present disclosure, a method for a vehicle includes responsive to detecting an accident, verifying an availability of a telematics control unit (TCU); generating an emergency message; responsive to verifying the TCU is unavailable, formatting and encoding the emergency message via a wireless controller to generate an emergency request; and responsive to detecting a digital entity within a predefined range from the vehicle, sending the emergency request to the digital entity via a wireless transceiver.

In one or more illustrative embodiment of the present disclosure, an apparatus includes a controller external to an accident vehicle, programmed to be responsive to receiving an emergency message from the accident vehicle, collect location data from a location controller, and send the emergency message with the location data to a server indicated in the emergency message.

BRIEF DESCRIPTION OF THE DRAWINGS

For a better understanding of the invention and to show how it may be performed, embodiments thereof will now be described, by way of non-limiting example only, with reference to the accompanying drawings, in which.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

The present disclosure generally provides for a plurality of circuits or other electrical devices. All references to the circuits and other electrical devices, and the functionality provided by each, are not intended to be limited to encompassing only what is illustrated and described herein. While particular labels may be assigned to the various circuits or other electrical devices, such circuits and other electrical devices may be combined with each other and/or separated in any manner based on the particular type of electrical implementation that is desired. It is recognized that any circuit or other electrical device disclosed herein may include any number of microprocessors, integrated circuits, memory devices (e.g., FLASH, random access memory (RAM), read only memory (ROM), electrically programmable read only memory (EPROM), electrically erasable programmable read only memory (EEPROM), or other suitable variants thereof) and software which co-act with one another to perform operation(s) disclosed herein. In addition, any one or more of the electric devices may be configured to execute a computer-program that is embodied in a non-transitory computer readable medium that is programmed to perform any number of the functions as disclosed.

The present disclosure, among other things, proposes a vehicle wireless communication system. More specifically, the present disclosure proposes a vehicle system allowing a vehicle to send out an emergency/distress message in emergency situations when the on-board TCU is not available.

Figure 1:
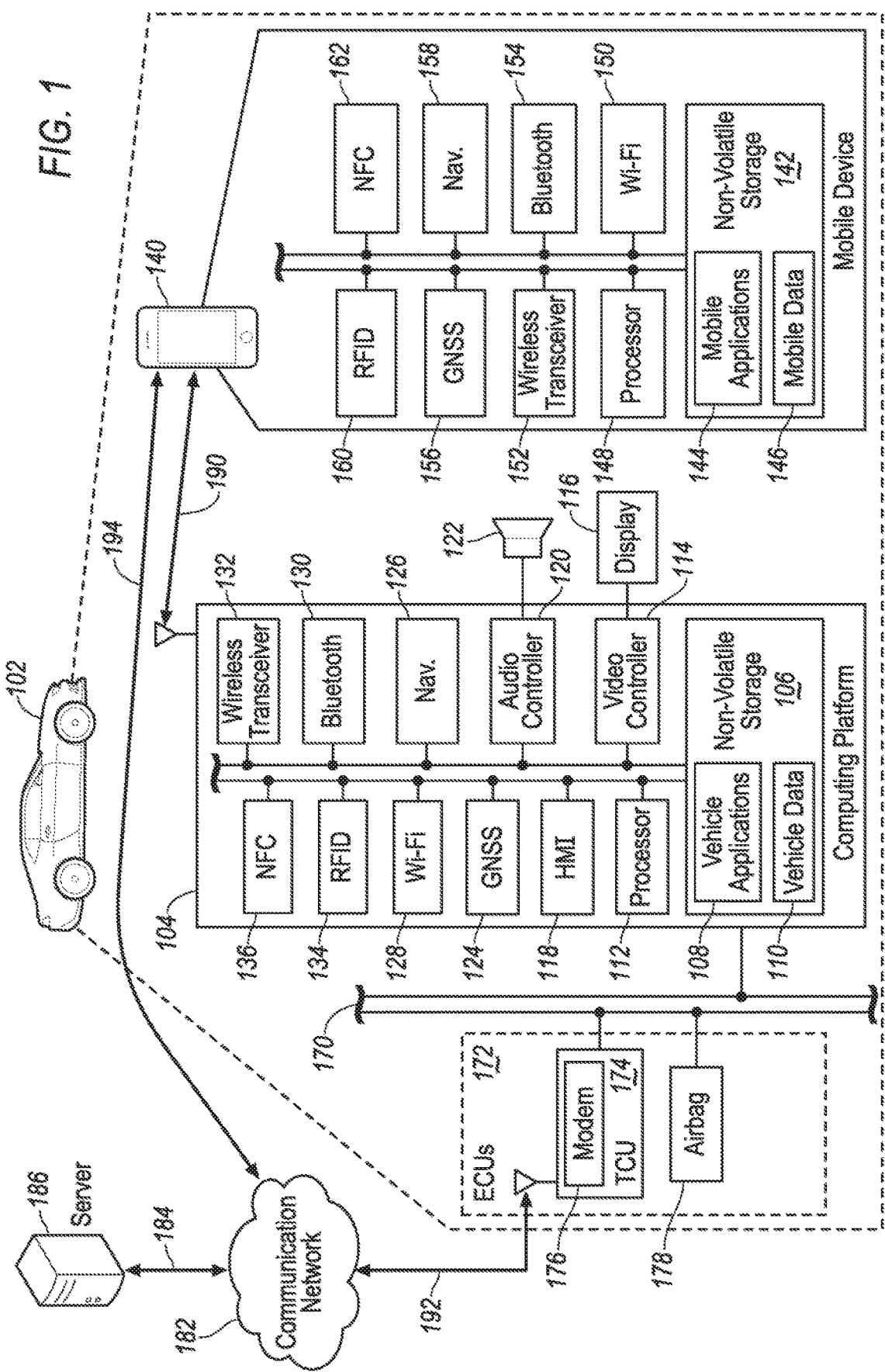
FIG. 1 illustrates an example block topology of a vehicle system of one embodiment of the present disclosure.

Referring to FIG. 1, an example block topology of a vehicle system 100 of one embodiment of the present disclosure is illustrated. A vehicle 102 may include various types of automobile, crossover utility vehicle (CUV), sport utility vehicle (SUV), truck, recreational vehicle (RV), boat, plane, or other mobile machine for transporting people or goods. In many cases, the vehicle 102 may be powered by an internal combustion engine. As another possibility, the vehicle 102 may be battery electric vehicle (BEV), a hybrid electric vehicle (HEV) powered by both an internal combustion engine and one or move electric motors, such as a series hybrid electric vehicle (SHEV), a parallel hybrid electric vehicle (PHEV), or a parallel/series hybrid vehicle (PSHEV), a boat, a plane or other mobile machine for transporting people or goods. As an example, the system 100 may include the SYNC system manufactured by The Ford Motor Company of Dearborn, Mich. It should be noted that the illustrated system 100 is merely an example, and more, fewer, and/or differently located elements may be used.

As illustrated in FIG. 1, a computing platform 104 may include one or more processors 112 configured to perform instructions, commands, and other routines in support of the processes described herein. For instance, the computing platform 104 may be configured to execute instructions of vehicle applications 108 to provide features such as navigation, satellite radio decoding, and wireless communications. Such instructions and other data may be maintained in a non-volatile manner using a variety of types of computer-readable storage medium 106. The computer-readable medium 106 (also referred to as a processor-readable medium or storage) includes any non-transitory medium (e.g., tangible medium) that participates in providing instructions or other data that may be read by the processor 112 of the computing platform 104. Computer-executable instructions may be compiled or interpreted from computer programs created using a variety of programming languages and/or technologies, including, without limitation, and either alone or in combination, Java, C, C++, C#, Objective C, Fortran, Pascal, Java Script, Python, Perl, and PL/SQL.

The computing platform 104 may be provided with various features allowing the vehicle occupants/users to interface with the computing platform 104. For example, the computing platform 104 may receive input from human-machine interface (HMI) controls 118 configured to provide for occupant interaction with the vehicle 102. As an example, the computing platform 104 may interface with one or more buttons (not shown) or other HMI controls configured to invoke functions on the computing platform 104 (e.g., steering wheel audio buttons, a push-to-talk button, instrument panel controls, etc.).

The computing platform 104 may also drive or otherwise communicate with one or more displays 116 configured to provide visual output to vehicle occupants by way of a video controller 114. In some cases, the display 116 may be a touch screen further configured to receive user touch input via the video controller 114, while in other cases the display 116 may be a display only, without touch input capabilities. The computing platform 104 may also drive or otherwise communicate with one or more speakers 122 configured to provide audio output to vehicle occupants by way of an audio controller 120.

The computing platform 104 may also be provided with navigation and route planning features through a navigation controller 126 configured to calculate navigation routes responsive to user input via e.g., the HMI controls 118, and output planned routes and instructions via the speaker 122 and the display 116. Location data that is needed for navigation may be collected from a global navigation satellite system (GNSS) controller 124 configured to communicate with multiple satellites and calculate the location of the vehicle 102. The GNSS controller may be configured to support various global or regional location systems such as global positioning system (GPS), Galileo, Beidou, Global Navigation Satellite System (GLONASS) and etc. Map data used for route planning may be stored in the storage 106 as a part of the vehicle data 110. Navigation software may be stored in the storage 116 as a part of the vehicle applications 108.

The computing platform 104 may be configured to wirelessly communicate with one or more digital entities via a wireless transceiver 132. For instance, the computing platform 104 may be configured to communicate with another vehicle (not shown) equipped with a compatible transceiver via a wireless connection using the wireless transceiver 132. Additionally or alternatively, the computing platform 104 may be configured to communicate with a mobile device 140 of the vehicle users/occupants via a wireless connection 190. The mobile device 140 may be any of various types of portable computing device, such as cellular phones, tablet computers, smart watches, laptop computers, portable music players, or other device capable of communication with the computing platform 104. The wireless transceiver 132 may be in communication with a WiFi controller 128, a Bluetooth controller 130, a radio-frequency identification (RFID) controller 134, a near-field communication (NFC) controller 136, and other controllers such as a Zigbee transceiver, an IrDA transceiver (not shown), and configured to communicate with a compatible wireless transceiver 152 of the mobile device 140.

The mobile device 140 may be provided with a processor 148 configured to perform instructions, commands, and other routines in support of the processes such as navigation, telephone, wireless communication, and multi-media processing. For instance, the mobile device 140 may be provided with location and navigation functions via a navigation controller 158 and a GNSS controller 156.

The mobile device 140 may be provided with a wireless transceiver 152 in communication with a WiFi controller 150, a Bluetooth controller 154, a RFID controller 160, a NFC controller 162, and other controllers (not shown), configured to communicate with the wireless transceiver 132 of the computing platform 104.

The computing platform 104 may be further configured to communicate with various electronic control units (ECUs) via one or more in-vehicle network 170. The in-vehicle network 170 may include, but is not limited to, one or more of a controller area network (CAN), an Ethernet network, and a media-oriented system transport (MOST), as some examples.

Vehicle 102 may include multiple ECUs 172 configured to control and operate various features of the vehicle 102. As a few non-limiting examples, the ECUs 172 may include a TCU 174 configured to control telecommunication between vehicle 102 and a communication network 182 through a wireless connection 192 using a modem 176. The communication network 182 may be any type of wireless network such as a cellular network enabling the communication between a remote server 186 and the computing platform 104. It is noted that, the remote server 186 is used as a general term throughout the present disclosure and may refer to any cloud-based services involving multiple servers, computers, devices and the like.

The ECU 172 may further include an airbag controller 178 configured to control the deployment of one or more airbags of the vehicle 102 responsive to detecting an accident via one or more sensors (not shown). In case of an accident, the airbag controller 178 may be further configured to send an airbag deployment message to the computing platform 104 via the in-vehicle network 170 responsive to deploying one or more airbag to notify about an accident. In response, the computing platform 104 may be configured to automatically report the incident to the server 186 via the TCU 174. For instance, responsive to receiving the airbag deployment message from the airbag controller 178, the computing platform 104 may automatically initiate a phone call to a predefined operator via the communication network 182 using the TCU 174 to establish a voice connection. Additionally or alternatively, the computing platform 104 may generate a message including relevant information such as time, location, occupancy of the vehicle, and/or type of impact and send the message to the server 186 via the communication network 182 to facilitate a prompt response by an emergency responder if needed.

In some cases, however, the TCU 174 may suffer damages by the impact of an accident and is no longer available to connect to the communication network 182 for emergency communication purposes while the computing platform 104 is still functioning. For instance, in case that the vehicle 102 suffers a frontal damage, the TCU 174 located at the front of the vehicle near the engine bay may be damaged. However, since the computing platform 104 may be located inside the vehicle cabin, it may suffer less damage as compared with the damage for the TCU 174 and may still be functioning. As a result, the wireless transceiver 132 integrated with or located near the computing platform 104 may be more likely to survive the accident compared with other ECUs 172 of the vehicle 102. Therefore, the wireless transceiver 132 may be utilized to perform an emergency communication in case that the TCU 174 is not available.

As an example, responsive to detecting the unavailability of the TCU 174, the computing platform 104 may seek alternative route to communicate with the server 186 to report the accident. The computing platform 104 may be configured to search for an available compatible digital entity within the transmission range of the wireless transceiver 132 which is still functioning. The digital entity may be the mobile device 140 or a compatible wireless transceiver of vehicle at the vicinity of the accident scene. The computing platform 104 may be configured to generate an emergency message and send to the detected digital entity via the wireless transceiver 132 asking to forward the message to the server 186. The digital entity may be configured to follow the instructions and forward the emergency message to the server 186 to report the incident.

Figure 2:
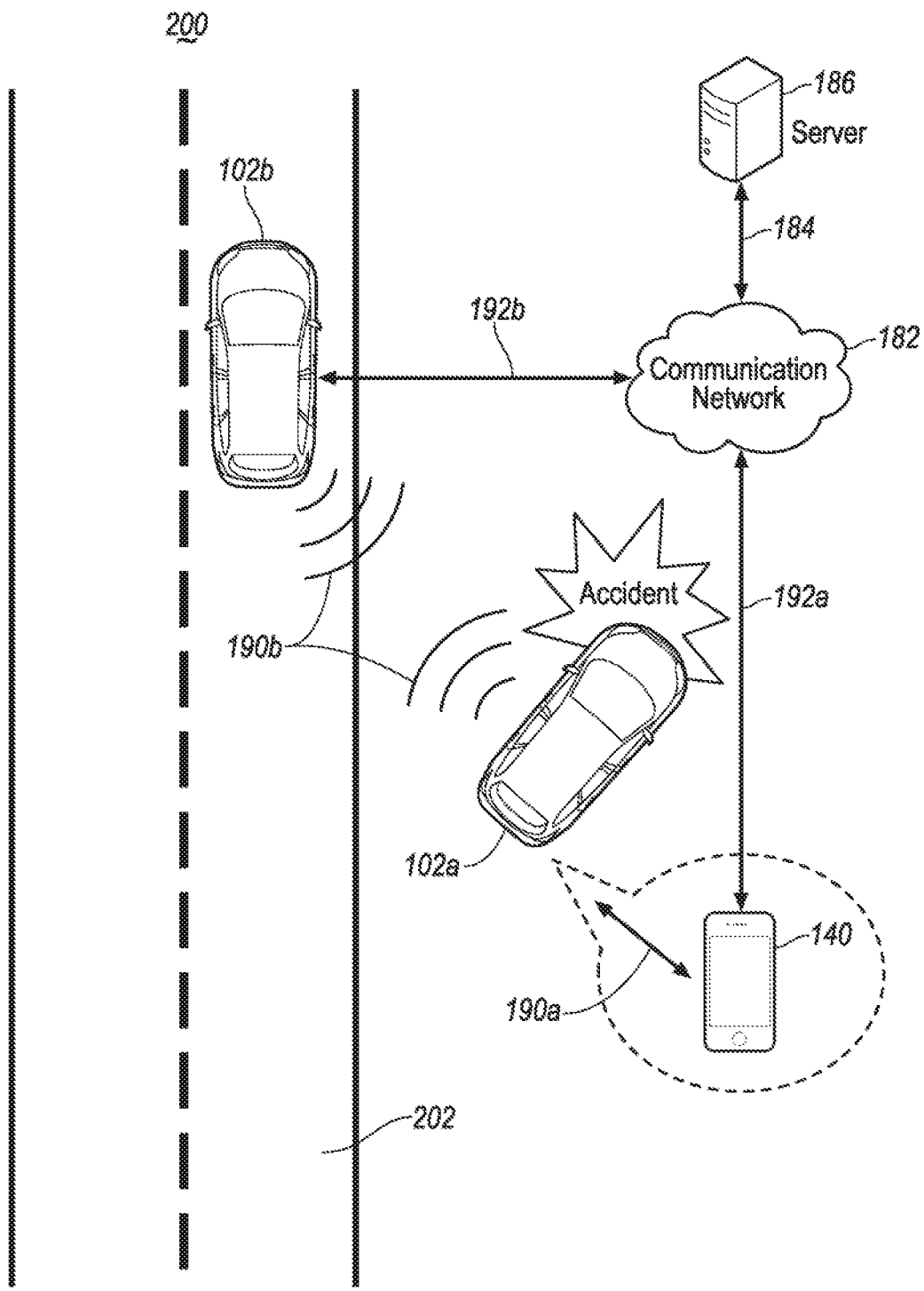
FIG. 2 illustrates an example diagram of one embodiment of the present disclosure.

Referring to FIG. 2, an example diagram of one embodiment of the present disclosure is illustrated. With continuing reference to FIG. 1, in this embodiment, a vehicle 102a veers off the road 202 and has an accident. Responsive to detecting the accident through ECUs 172 such as the airbag controller 178 sending an airbag deployment signal, the computing platform 104 of the accident vehicle 102a may generate an emergency message using data collected from various components of the accident vehicle 102 to send out to the server 186 via the TCU 174. For instance, the emergency message may include location data received from the GNSS controller 124, airbag deployment data from the airbag controller 178, occupancy data from one or more seat sensors (not shown), and the like. However, the TCU 174 may suffer damages from the accident and is no longer available to communicate with the communication network 182. Responsive to detecting the unavailability of the TCU 174, the computing platform 104 of the accident vehicle 102a may verify if other wireless controllers are still working. For instance, responsive to detecting the RFID controller 134 is undamaged, the computing platform 104 may send the emergency message to the RFID controller 134 to convert to a compatible RFID format. The computing platform 104 may further activate the wireless transceiver 132 and starts to broadcast the emergency message using RFID transmission.

As illustrated in FIG. 2, a mobile device 140 may be at the vicinity of the accident vehicle 102a immediately after the accident. The computing platform 104 may detect and connect to the mobile device 140 via a wireless connection 190a. The mobile device 140 may be carried by an occupant of the accident vehicle 102a and survive the impact of the accident. The mobile device 140 may belong to a passerby at the vicinity of the accident scene. Additionally or alternatively, a second vehicle 102b near the accident scene may be equipped with a compatible wireless transceiver and detected by the accident vehicle 102a. A wireless connection 190b may be established between the accident vehicle 102a and the nearby vehicle 102b. Alternatively, the wireless transceiver 132 of the accident vehicle 102a may be configured to broadcast the emergency message before the wireless connection 190 is established. Responsive to detecting the compatible digital entities including the mobile device 140 and/or the nearby vehicle 102b, the computing platform 104 may send out an emergency request including the emergency message to each compatible digital entity asking to forward the message to the server 186. Responsive to receiving the request, the mobile device 140 and/or the nearby vehicle 102b may send the emergency message to the server 186 to report the incident. Alternatively, there may be more digital entities near the accident scene in reality and only one emergency message needs to be sent to the server to inform the authority. In case that multiple digital entities are detected (e.g. multiple vehicles are near the accident scene), the computing platform 104 of the accident vehicle 102a only needs to send out the emergency message once via one nearby digital entity.

It is noted that, although the emergency message may be transmitted using the RFID controller 134, the present disclosure is not limited thereto and other wireless communication technologies may be used. For instance, the emergency message may be transmitted to the digital entity via the NFC controller 136, the Bluetooth controller 130, the WiFi controller 128 and the like. The content of the emergency message may not be limited to the above-discussed information and may vary depending on various factors such as the types of transmission technology due to speed and capacity limitations. For instance, an emergency message transmitted via the WiFi controller 128 may include more information compared to an emergency message transmitted via the NFC controller 136 due to the connection speed. In some instances, the emergency message transmitted from the accident vehicle 102a to the digital entity such as the nearby vehicle 102b and/or mobile device 140 may only include an accident indicator and the digital entity may use its own location to inform the server 186. Since the transmission range of the wireless transceiver is limited, the difference between the location of the accident vehicle 102 and the location of the digital entity may be minor and negligible for emergency response purposes. Additionally, the digital entity may be further configured to upload additional data to the server 186 to facilitate the emergency response. The additional data may include an image of the accident scene captured by a camera connected to the digital entity to provide a better view of the accident. In case that the digital entity is the nearby vehicle 102b provided with a dashcam (not shown) continuously capturing video images, the accident scene image may be automatically selected from the video using image recognition technologies. Alternatively, in case that the digital entity is the mobile device 140 carried by the occupant of the accident vehicle or a passerby, the mobile application software may invite the user to take a picture of the accident scene to upload.

Figure 3:
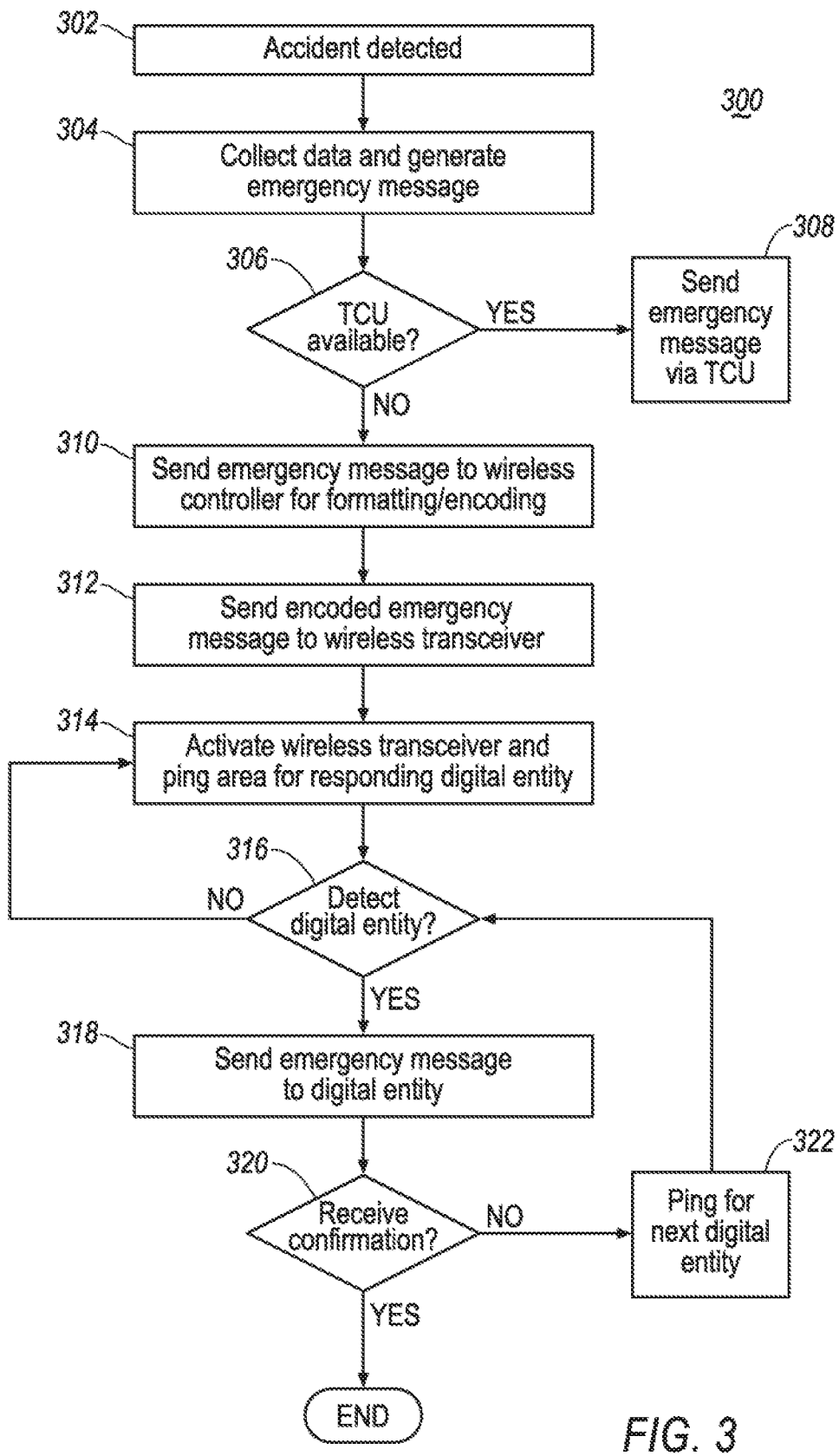
FIG. 3 illustrates an example flow diagram of one embodiment of the present disclosure.

Referring to FIG. 3, an example flow diagram of a process 300 for one embodiment of the present disclosure is illustrated. With continuing reference to FIGS. 1 and 2, at operation 302, the computing platform 104 detects an accident via ECUs 172 such as the airbag controller 178 sending an airbag deployment signal via the in-vehicle network 170. In response, the computing platform 104 collects data from various components of the vehicle 102 and generates an emergency message using the collected data at operation 304. For instance, the computing platform 104 may collect vehicle location data from the GNSS controller 124 and vehicle occupancy data from one or more seat sensors (not shown) to generate the emergency message.

At operation 306, the computing platform 104 verifies if the TCU 174 is still available to send out the emergency message. The emergency message is preferably to be sent to the server 186 associated with emergency responders via the TCU 174 to facilitate a quick response. Therefore, if the answer to operation 306 is a yes, the process proceeds to operation 308 and the TCU 174 sends the emergency message to the server 186 via the communication network 182. However, as discussed above, the TCU 174 may be damaged by the impact of the accident and no longer available to send out the emergency message. In this case, the process proceeds to operation 310 and the computing platform 104 sends the emergency message to a predefined wireless controller, such as the RFID controller 134, for formatting and encoding. Additionally or alternatively, other wireless controllers may be used. The computing platform may be further configured to poll each wireless controller to verify which wireless controller is still available and only send the emergency message to the available wireless controller.

Responsive to finishing formatting and encoding the emergency message, the wireless controller sends the encoded emergency message to the wireless transceiver 132 to send out. At operation 314, the computing platform 104 activates the wireless transceiver 132 and starts to ping an area near the vehicle 102 for a responding digital entity. Responsive to detecting a digital entity such as the mobile device 140 or the nearby vehicle 102*b* within the transmission range of the wireless transceiver 132 at operation 316, the process proceeds to operation 318 and the wireless transceiver 132 sends the emergency message to the digital entity. The emergency message may include a request asking the digital entity to forward the message to the server 186. If the digital entity successfully sends the emergency message to the server 186, a confirmation may be sent back to the accident vehicle 102*a*. At operation 320, the computing platform 104 checks if a confirmation is received within a predefined period of time (e.g. 10 seconds). Responsive to receiving such confirmation, the process ends. Otherwise, the process proceeds to operation 322 and the wireless transceiver 132 pings for the next digital entity and repeats operations 316 to 320 until the emergency message is successfully sent to the server 186.

In an alternative embodiment, the computing platform 104 may be configured to broadcast the emergency message via the wireless transceiver 132 without first establishing a wireless connection 190 with any digital entities. The broadcast embodiment may be particularly applicable in RFID and NFC transmissions due to simple transmission protocols.

Figure 4:
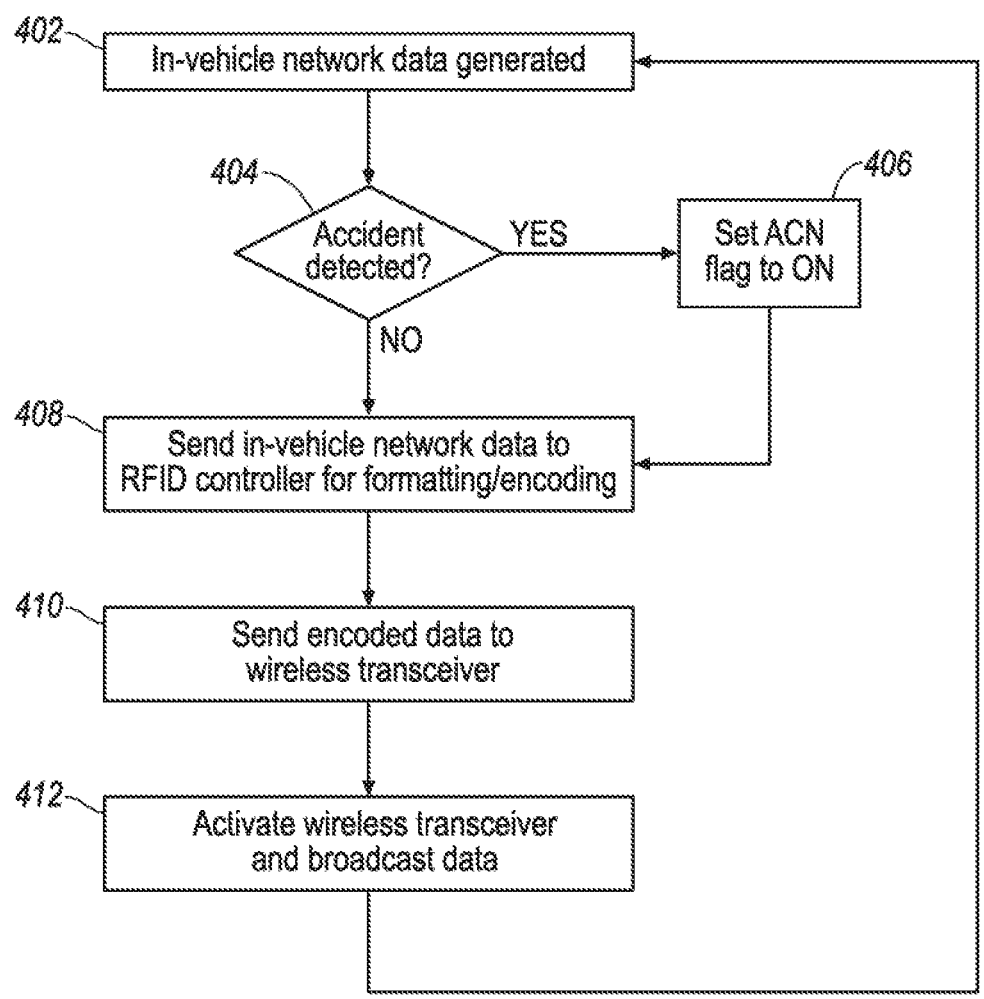
FIG. 4 illustrates an example flow diagram of another embodiment of the present disclosure.

Referring to FIG. 4, an example flow diagram of a process 400 for another embodiment of the present disclosure is illustrated. Compared with the embodiment illustrated with reference to FIG. 3, the RFID broadcast technology is utilized in the present embodiment. In addition, the computing platform 104 may actively generate real-time in-vehicle network data and broadcast the data out with or without an accident in the present embodiment. At operation 402 the computing platform 104 generates in-vehicle network data to send out. The in-vehicle network data may include various data such as vehicle identification number (VIN), stored in the storage 106 as a part of the vehicle data 110; location data from the GNSS controller 124, and system diagnostic data from various ECUs 172. At operation 404 the computing platform 104 detects whether an accident has occurred via ECUs 172 such as the airbag controller 178 sending an airbag deployment signal via the in-vehicle network 170. If the answer is a yes, the process proceeds to operation 406 and the computing platform 104 sets an automatic crash notification (ACN) Flag to ON. At operation 408, the computing platform 104 sends the in-vehicle network data to the RFID controller 134 for formatting and encoding. The in-vehicle network data sent to the RFID controller 134 may or may not include the ACN Flag depending on the detection result from operation 404. In case that there is no accident and the ACN Flag is OFF, the computing platform 104 may still send out the in-vehicle network data for other purposes such as locating and identifying reported vehicle, diagnostics, statistics or the like.

Responsive to successfully formatting and encoding the in-vehicle network data, at operation 410, the computing platform 104 sends the encoded date to the wireless transceiver 132 for broadcasting. At operation 412, the computing platform 104 activates the wireless transceiver 132 to broadcast the encoded data out from the vehicle 102. The process 400 repeats itself from operation 402 to generate new and/or updated in-vehicle network data for broadcasting. Since the encoded data is broadcasted by the wireless transceiver 132, no receiving entity is required before the broadcast transmission is performed.

Figure 5:
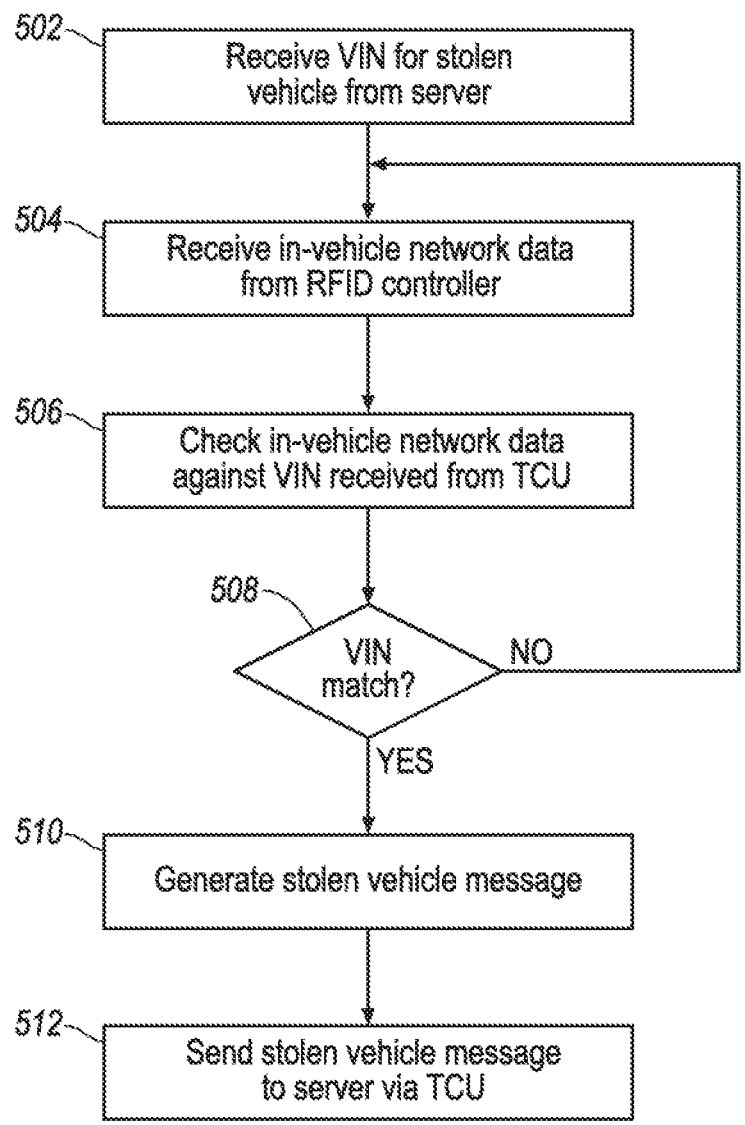
FIG. 5 illustrates an example flow diagram of another embodiment of the present disclosure.

Referring to FIG. 5, a flow diagram for a process 500 of another embodiment of the present disclosure is illustrated. As an example, the process 500 may be performed on a RFID broadcast receiving vehicle and used to identify and locate vehicles that have been reported stolen via RFID transmissions. At operation 502, the computing platform 104 of the vehicle 102 receives a report data including a VIN for a vehicle that has been reported stolen from the server 186 via the TCU 174. The report data may be periodically sent from the server 186 operated by a vehicle manufacturer or legal authority. Responsive to receiving the report data, the computing platform 104 may store the report data in the storage 106 as a part of the vehicle data 110 for future references.

At operation 504, the computing platform 104 of the vehicle 102 receives an RFID broadcast transmission from another vehicle at the vicinity of the vehicle 102 within the RFID transmission range supported by the wireless transceiver 132. The RFID broadcast transmission may include an in-vehicle network data including a VIN of the other vehicle as discussed reference to FIG. 4. Responsive to receiving the RFID broadcast transmission, at operation 506, the computing platform 104 checks the VIN number included in the in-vehicle network data received via RFID against the VIN number for the reported stolen vehicle stored in the storage 106.

If no match is found at operation 508, the process returns to operation 504 and the computing platform 104 waits for the next RFID transmission. Otherwise, responsive to detecting a VIN match, the process proceeds to operation 510 and the computing platform 104 generates a stolen vehicle message which may include the in-vehicle network data received RFID in addition to a current location of the vehicle 102 from the GNSS controller 124. At operation 512, the computing platform 104 sends the stolen vehicle message to the server 186 via the TCU 174 through the communication network 182 to report the incidence.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A vehicle comprising:
one or more controllers, programmed to
responsive to detecting an accident event and an unavailability of a telematics controller, generate an emergency message to broadcast by a radio-frequency identification (RFID) transceiver, and responsive to detecting a digital entity within a predetermined range from the vehicle, send the emergency message to the digital entity, and responsive to detecting the RFID transceiver is unavailable, send the emergency message via a secondary wireless controller including at least one of: a near-field communication controller (NFC), a Bluetooth controller, or a WiFi controller.

2. The vehicle of claim 1, wherein the one or more controllers are further programmed to detect the accident event using a signal received from an airbag controller.

3. The vehicle of claim 1, wherein the one or more controllers are further programmed to collect at least one of the following items of information to generate the emergency message: location information from a global navigation satellite system (GNSS) controller, occupancy information from one or more seat sensors, or airbag deployment information from an airbag controller.

4. The vehicle of claim 1, wherein the one or more controllers are further programmed to, responsive to failing to receive a confirmation from the digital entity indicative of a successful transmission of the emergency message within a predefined time period, search for a second RFID entity.

5. The vehicle of claim 1, wherein the digital entity is a mobile device within the predetermined range from the vehicle.

6. The vehicle of claim 1, wherein the digital entity is a second vehicle within the predetermined range from the vehicle.

7. The vehicle of claim 1, wherein the one or more controllers are further programmed to broadcast the emergency message via the RFID transceiver.

8. A method for a vehicle, comprising:
responsive to detecting an accident, verifying an availability of a telematics control unit (TCU);
generating an emergency message;
responsive to verifying the TCU is unavailable, formatting and encoding the emergency message via a wireless controller to generate an emergency request; and
responsive to detecting a digital entity within a predefined range from the vehicle, sending the emergency request to the digital entity via a wireless transceiver,
wherein the emergency request includes an identification of a server for the digital entity to contact, and a request to send a location data of the digital entity to the server.

9. The method of claim 8, further comprising:
polling a plurality of wireless controllers to verify if any of the plurality of wireless controllers is available after detecting the accident.

10. The method of claim 8, wherein the wireless controller includes one of: a radio-frequency identification (RFID) controller, a near-field communication controller (NFC), a Bluetooth controller, or a WiFi controller.

11. The method of claim 8, wherein the emergency request includes at least one of: a location information from a global navigation satellite system (GNSS) controller, an occupancy information from one or more seat sensors, or an airbag deployment information from an airbag controller.

* * * * *